S. GULLICKSEN.
Clutch-Coupling.
No. 218,017.    Patented July 29, 1879.
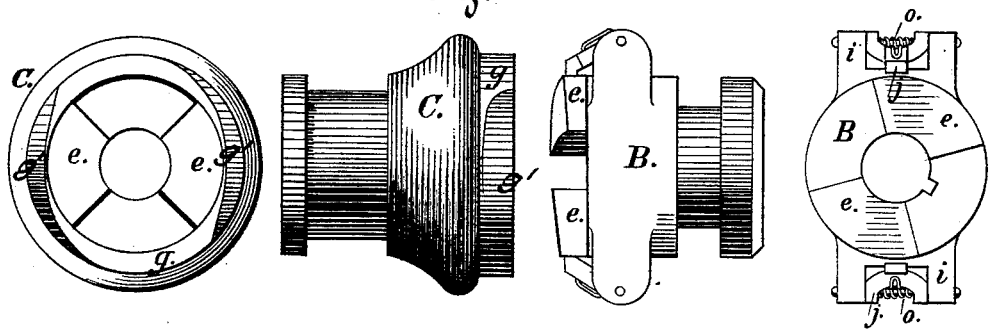
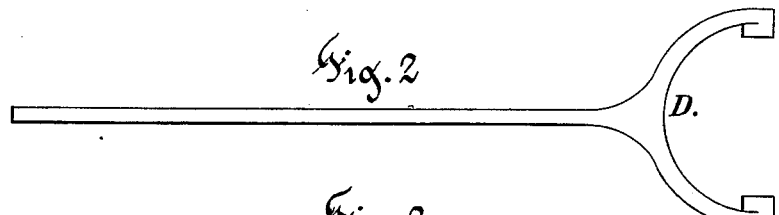
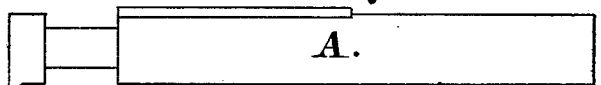
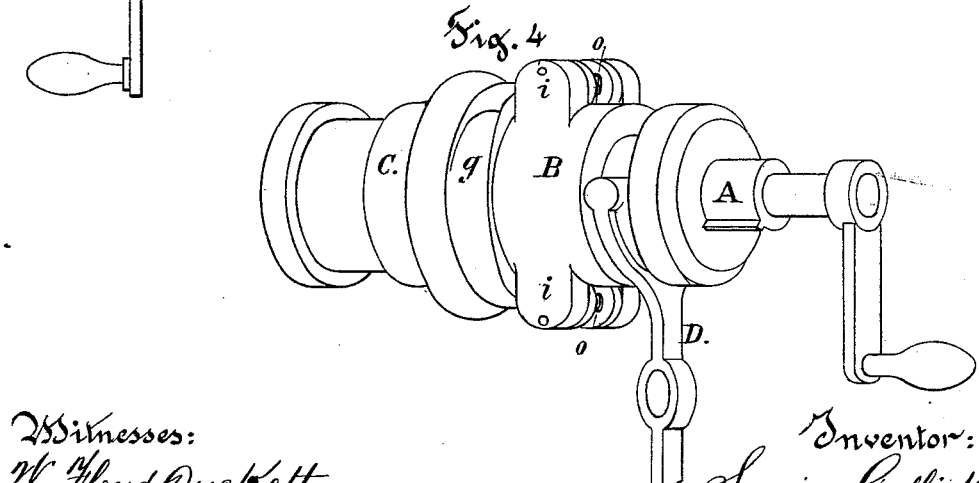
Witnesses:
W. Floyd Duckett
W. F. Clark
Inventor:
Severin Gullicksen
per J. L. Boone
Attorney.

UNITED STATES PATENT OFFICE.

SEVERIN GULLICKSEN, OF SAN FRANCISCO, CALIFORNIA.

IMPROVEMENT IN CLUTCH-COUPLINGS.

Specification forming part of Letters Patent No. 218,017, dated July 29, 1879; application filed April 21, 1879.

*To all whom it may concern:*

Be it known that I, SEVERIN GULLICKSEN, of the city and county of San Francisco, State of California, have invented an Improved Clutch-Coupling; and I do hereby declare that the following is a full, clear, and exact description thereof, reference being had to the accompanying drawings.

The object of my invention is to relieve the shock or sudden strain which is occasioned by bringing the two parts of a clutch-coupling together when one part is in motion and the other is stationary.

Referring to the accompanying drawings, Figure 1 represents detached views of the two clutches. Fig. 2 is a detached view of the lever. Fig. 3 is a detached view of the crank; and Fig. 4 is a perspective view of my improved clutch-coupling.

Let A represent a shaft, upon which one part, B, of a clutch-coupling is arranged to slide on a feather in the usual way, and let C represent the other part of the coupling, which is connected with another shaft, so that by engaging the two parts of the coupling the two shafts are connected and driven by the same power as a single shaft. D is the lever by means of which the sliding part B of the clutch is moved on the shaft in order to bring the two parts together.

The clutches B C, I construct with lugs $e$ in the ordinary way, so that they will interlock when the parts are brought together.

In an ordinary coupling of this kind, if the two parts are brought together while one is in motion and the other is stationary, the sudden engagement or interlocking of the lugs will cause a jar or shock to the shaft and machinery connected with it, so that the coupling must be done when both parts are stationary. This is often inconvenient and expensive.

My clutch-coupling, however, I provide with a brake, which enables me to throw the two clutches into engagement when one part is stationary and the other is in rotation without creating any material jar or shock. To do this I make the ends of the interlocking lugs of one clutch inclining in one direction and the ends of the lugs of the other inclining in an opposite direction. Around the clutch C, I then secure a band or ring, $g$, the rim or edge of which projects slightly beyond the outer edge of the inclined lugs $e$. I then bevel the outside edge of the band or ring opposite each lug, as at $g'$, so as to form it into a curved wedge, the narrowest point being opposite the outermost part of each lug and gradually widening as the bevel decreases to a point opposite the recess between the two lugs.

The sliding clutch B, I form with two lugs, $i\ i$, on each side, just above the interlocking lugs $e$, and between these lugs I secure the brake-bar. This brake consists of a bar, $j$, the rear end of which is bifurcated, and this end is placed between the lugs $i\ i$ and a bolt or pin passed through the lugs and through the ends of the bar. The outer end of this bar extends out just as far as the ends of the lugs $e$, and is pressed down upon the lug $e$ by a spring, O, which, in the present instance, is coiled around the bolt or pin between the branches of the bar, while its ends press down upon the forward end of the bar. This keeps the outer end of the bar close down upon the lug, so that when the sliding clutch B is moved against the end of the clutch C the end of the bar will bear against the edge or rim of the band or ring $g$ until the rotation of the shaft A brings the narrowest part or knife-edge of the wedge portion between the lug $e$ and end of the bar $j$, so as to lift the bar $j$ and cause it to move on the outside beveled edge of the band, allowing the inclined ends or faces of the lugs $e$ to come together. Pressure upon the lever D then forces the lugs $e$ inward as their inclined ends move past each other, at the same time that the increasing thickness of the edge of the band or ring $g$ gives an increased friction or pressure of the bar $j$ upon it until the lugs $e$ pass each other and interlock, leaving the bar $j$ on the outside of the band $g$.

To disengage the clutches the sliding clutch B can be thrown directly out of connection by means of the lever at any time. This arrangement causes the clutches to come together gradually and without jar. The bar $j$ serves as a brake to give a gradually-increasing pressure and allow the two parts to move together in a positive manner.

Having thus described my invention, what I claim, and desire to secure by Letters Patent, is—

1. The clutch C, with its lugs e, with their beveled ends, and having the band g, with its wedge-shaped beveled edge g', arranged as described, in combination with the clutch B, with its presser-bar j, substantially as and for the purpose described.

2. A brake for clutch-couplings, consisting of a curved wedge applied to one of the clutches, in combination with a spring-presser on the opposite clutch, combined and arranged to operate substantially as set forth.

In witness whereof I have hereunto set my hand and seal.

SEVERIN GULLICKSEN. [L. S.]

Witnesses:
W. FLOYD DUCKETT,
W. F. CLARK.